United States Patent [19]

Skoli et al.

[11] 4,300,923

[45] Nov. 17, 1981

[54] DEARATOR SYSTEM HAVING POSITIVE PRESSURE INDICATING MEANS

[75] Inventors: Sigmund P. Skoli, Elmwood; Robert J. Dulian, Chicago; David M. Kemp, Naperville, all of Ill.

[73] Assignee: Mojonnier Bros. Co., Chicago, Ill.

[21] Appl. No.: 138,103

[22] Filed: Apr. 7, 1980

[51] Int. Cl.³ .......................... B01D 19/00; B01F 3/04
[52] U.S. Cl. .......................................... 55/196; 55/274;
137/557; 261/DIG. 7; 426/475; 426/477;
426/487
[58] Field of Search ................ 55/39, 189, 193, 196,
55/274; 73/700, 744, 745; 210/90; 261/DIG. 7,
DIG. 27; 426/475, 477, 487; 137/557

[56] References Cited

U.S. PATENT DOCUMENTS

| | | | |
|---|---|---|---|
| 2,778,223 | 1/1957 | Kimbrell | 137/557 X |
| 3,024,655 | 3/1962 | Dwyer et al. | 55/274 X |
| 3,027,136 | 3/1962 | Renaldi et al. | 137/557 X |
| 3,172,746 | 3/1965 | Shuck | 55/274 |
| 3,473,563 | 10/1969 | Tatum | 137/557 |
| 3,741,552 | 6/1973 | Skoli et al. | 55/39 X |
| 3,780,198 | 12/1973 | Pahl et al. | 426/477 |
| 4,022,119 | 5/1977 | Karr | 261/DIG. 7 |
| 4,112,828 | 9/1978 | Mojonnier et al. | 55/189 X |
| 4,148,338 | 4/1979 | Skoli | 137/515.7 |

*Primary Examiner*—Robert H. Spitzer
*Attorney, Agent, or Firm*—Trexler, Bushnell & Wolters, Ltd.

[57] ABSTRACT

There is disclosed an improved dearator system for purging air from water. The disclosed system includes a container for containing the water, cooling means within the container for cooling the water to force air therefrom, and means for introducing carbon dioxide gas into the container to establish a positive pressure therein. The system also includes a positive pressure indicator means for indicating when the positive pressure within the container is reached. The indicator includes a housing having a bore in fluid communication with the container, a seat within the bore, and a ball within the bore. The ball is viewable through the housing and is arranged to disengage from the seat in response to positive pressure within the container to provide a readily discernible indication of positive pressure therein. The system also includes a check valve functionally interposed between the container and the positive pressure indicator for intercepting liquid travelling towards the indicator housing to thereby inhibit damage to the housing.

10 Claims, 3 Drawing Figures

U.S. Patent  Nov. 17, 1981  4,300,923
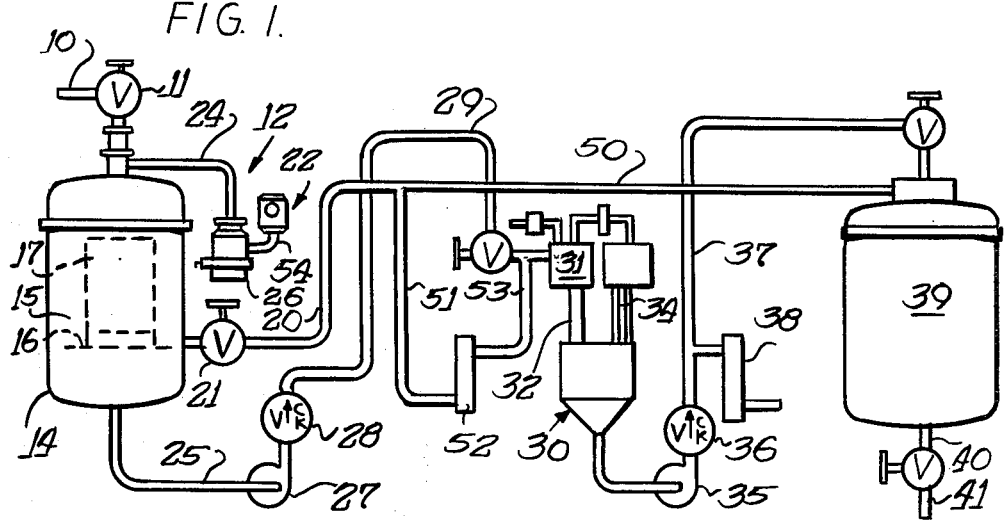
FIG. 1.
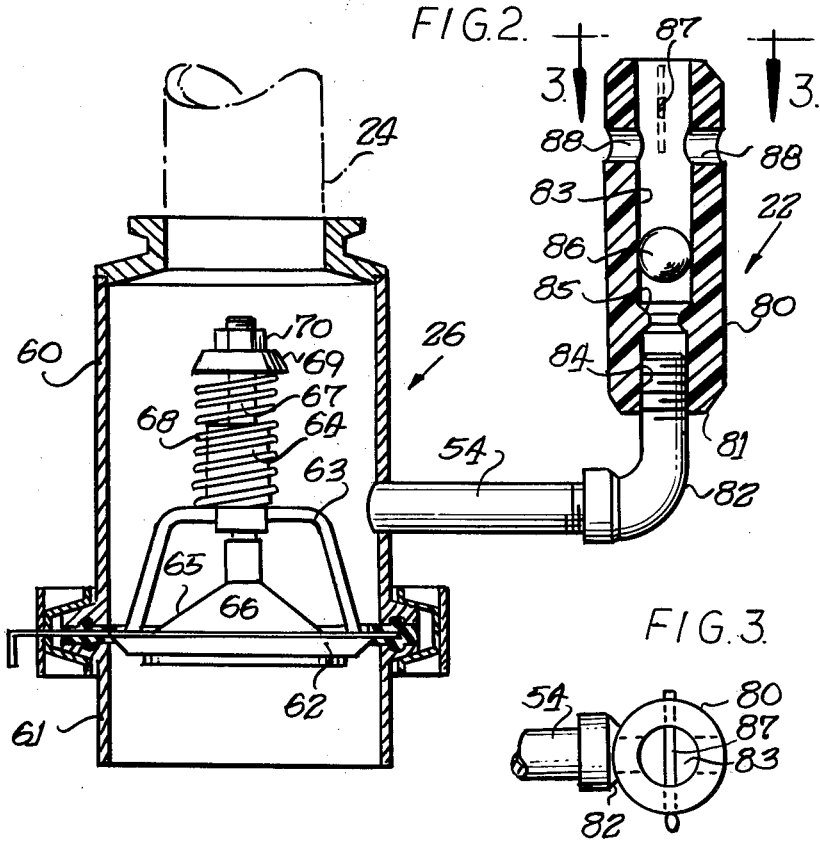
FIG. 2.
FIG. 3.

4,300,923

DEAERATOR SYSTEM HAVING POSITIVE PRESSURE INDICATING MEANS

BACKGROUND OF THE INVENTION

The present invention relates generally to an improved deaerator system for removing air from water which is to be used in carbonated beverages, and more particularly to a positive pressure indicating means for use in such a deaerator system.

Modern beverage processing systems prepare or formulate large amounts of soft drink beverages or the like and place the beverages in containers such as cans or bottles at high rates of speed. These containerized beverages are then shipped through distribution channels to retail stores and the like where they are purchased for consumption.

In the preparation of soft drinks, the dissolved air must be removed from the beverage if the beverage end product is to be of uniformly high quality and have long shelf life. Deaeration improves beverage stability in the filling process, minimizing foaming action in and out of the container during the period after the container has been filled and before the container closure is applied. If the beverage is contained within a can, inclusion of air can permit deterioration of the plastic can lining thereby damaging the can and spoiling the flavor of the beverage. Such occurrences are, of course, deleterious to the reputation and the subsequent sales efforts to the beverage maker.

In modern beverage processing systems, a deaerator vessel is included. The deaerator vessel includes a plurality of cooling plates which contact the water as the water moves through the vessel to cool the water and to force air from the water. The air escapes from its dissolved state within the water, and is drawn from the vessel through an appropriate pumping system.

To assure that external air does not enter the vessel during the deaeration process, a positive pressure is formed within the vessel. This positive pressure may be formed, for example, by introducing a gas, preferably carbon dioxide, into the vessel until a positive pressure within the vessel is obtained.

The carbon dioxide gas is normally introduced into the deaerator vessel through a valve which must be set to an appropriate opening which assures that a positive pressuure is maintained within the vessel. Because only a slight positive pressure within the vessel is necessary, the valve should be set so that only a minimum positive pressure is maintained within the vessel to avoid wasting the carbon dioxide gas. Unfortunately, prior deaerator systems have not provided a convenient means by which a positive pressure within the vessel may be indicated.

It is therefore a general object of the present invention to provide a new and improved deaerator system for use in purging air from water during the processing of carbonated beverages.

It is a more particular object of the present invention to provide a positive pressure indicating means for use in such a deaerator system which provides a readily discernible indication when positive pressure within the deaerator vessel is reached.

It is a further object to provide such a positive pressure indicating means which allows the existence of positive pressure within the deaerator vessel to be readily and visually detected by an operator.

It is a still further object of the invention to provide a deaerator system including such a positive pressure indicating means which further includes a check valve means for protecting the positive pressure indicating means from excessive back pressure caused by beverage processing system components downstream from the positive pressure indicating means.

SUMMARY OF THE INVENTION

The invention therefore provides an improved deaerator system for purging air from water which includes container means for containing the water, cooling means within the container means for cooling the water to force air therefrom, input means for introducing carbon dioxide gas into the container to establish a positive pressure therein, and positive pressure indicator means for indicating when the positive pressure within the container is reached. The positive pressure indicator means includes a housing coupled in fluid communication to the container means and having a substantially vertically disposed through bore, a seat formed within the bore, and indicating element means within the bore. The indicating element means is arrange to engage the seat in the absence of positive pressure within the container means and to disengage the seat in response to positive pressure within the container. The indicating element means is also viewable through the housing when disengaged from the seat to provide a readily discernible indication of positive pressure within the container means.

The invention further provides a positive pressure indicating means for indicating positive pressure within a chamber comprising a housing having a vented bore in fluid communication with the chamber, seat means formed within the bore, and indicating element means within the bore and viewable through the housing. The indicating element means is arranged to disengage from the seat in response to positive pressure within the chamber for indicating the presence of positive pressure within the chamber.

The present invention also provides a check valve means functionally interposed between the container and the indicating means housing for interdicting liquid travelling toward the housing to thereby inhibit damage to the housing.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by making reference to the following description taken in conjunction with the accompanying drawings, and the several figures of which like reference numerals identify identical elements, and wherein:

FIG. 1 is a schematic diagram of a beverage processing system including the present invention;

FIG. 2 is a sectional view showing a positive pressure indicating means embodying the present invention with an associated check valve arrangement for protecting the indicating means in accordance with the present invention; and FIG. 3 is a top view of the positive pressure indicating means of FIG. 2 as seen in the direction of lines 3—3 of FIG. 2.

DESCRIPTION OF THE PREFERRED EMBODIMENT

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Referring now to FIG. 1, there is shown in schematic form a modern beverage processing system embodying the present invention. Appropriately treated water is provided from an inlet source 10 through a valve 11 to a deaerator system 12 embodying the present invention. The deaerator system 12 includes a vessel or container 14 having an inner chamber 15 for containing a quantity of water at an appropriate level 16. Within the chamber 15 there are disposed a plurality of cooling plates 17 which cool the water for purging air therefrom. The water being treated within the vessel 14 is treated under the influence of a positive pressure caused by the introduction of carbon dioxide gas into the chamber 15 through a conduit 20 and a valve 21.

The positive pressure within the chamber 15 precludes air external to the vessel 14 from entering the vessel and thus the water. In accordance with a particular aspect of the present invention, the deaerator system 12 includes a positive pressure indicating means 22 which, as will be described more fully below, provides an operator with a readily discernible indication when a positive pressure is obtained within the vessel 14. The indicating means 22 is coupled to the vessel 14 through a conduit 24 and is in common fluid communication with a check valve 26. The check valve 26 is disposed functionally between the conduit 24 and the indicating means 22 so as to prevent damage to the indicating means 22 by excessive back pressure or water which may be caused to back up within the deaerator system 12 due to the operation of components downstream therefrom.

The deaerated water flows through an outlet pipeing 25, a water pump 27, and a check valve 28, and is directed by a first conduit 29 to a proportioner device 30. The water is introduced into the proportioner 30 through a proportioner water chamber 31.

In the proportioner, the water flows from the chamber 31 at controlled rates and in controlled amounts down a column 32 to a mixing chamber 33 and syrup is also drawn at controlled rates and in controlled amounts down a corresponding column 34 for simultaneous introduction into the mixing chamber 33. After thorough mixing, the syrup and water beverage mix is propelled by a pump 35 through a check valve 36 into relatively high pressure piping 37. At an appropriate point in this piping 37, a gas such as carbon dioxide is introduced through an appropriate flow meter 38. The gas and beverage mix then flows to a carbonator 39 so as to insure complete carbonation of the beverage. Thus, the upper regions of the carbonator 39 are maintained at a high pressure carbon dioxide atmosphere. Carbonator outlet piping 40 and appropriate valving 41 direct the carbonated beverage to a can, bottle or other container filler (not shown) for final containerization.

To introduce carbon dioxide gas into the deaerator system vessel 14, the gas can be drawn from the carbonator 39 through a conduit 50 which intersects with the conduit 20. Carbon dioxide gas is further introduced into the water chamber 31 by another conduit 51 which intersects conduit 20 and 50, a flow meter 52, and a conduit 53.

Referring now to FIG. 2, the positive pressure indicating means 22 and its associated protective check valve 26 may be there seen in greater detail. The check valve 26 includes a pair of sleeves 60 and 61 which axially extend respectively upstream and downstream of an annular valve seat member 62. The conduit 24 is in fluid connection with the sleeve 60 and the sleeve 60 is in fluid connection with the positive pressure indicating means 22 through a conduit 54.

From the valve seat 62, a yoke 63 extends axially upstream to mount an axially elongated head guide 64. A fluid flowchecking head 65 includes a radially extending base 66 and a slide 67 carried for slidable motion within the slide guide 64. It will be understood that upstream fluid pressure against the head base 66 causes the base to slide axially into and out of fluid-sealing engagement with the valve seat 62.

To urge the base 66 into the illustrated normally closed seated position, a biasing member such as a coiled spring 68 is positioned so as to surround the slide guide 64 and to engage a head cap 69 affixed to the head slide 67 as by a stopper nut 70. When the free-standing length of the spring 68 is selected so as to place the spring under compression between the yoke 63 and the cap 69 and the valve is fully assembled, the head 65 is drawn axially upwardly as illustrated into its seated, fluid-flow-stopping position.

Should one of the components of the system downstream from the dearator system 12 cause a back up of water within the system, a small quantity or slug of water may be introduced into the sleeve 60 through the conduit 24. This water slug will create a pressure against the base 66, and the pressure will unseat the base 66 from the seat member 62 to allow the backed up water to be exhausted from the system through the sleeve 61, in accordance with one aspect of the invention. As a result, the backed up water will not be permitted to enter the positive pressure indicating means 22.

The positive pressure indicating means 22 comprises a housing 80 having a near end 81 coupled to the conduit 54 by a bent conduit 82. The housing 80 includes a through bore 83 which may be threaded at its near end 84 so as to be threadingly received by the conduit 82. Formed within the bore 83 is an annular seat 85. Also within the bore 83 there is disposed an indicating element in the form of a ball 86 which, in the absence of positive pressure within the vessel 14 (FIG. 1) will engage and rest upon the annular seat 85.

Preferably, and in accordance with a particular aspect of the present invention, the ball 86 may be colored, such as red, and the housing 80 is preferably formed of transparent material so that the ball 86 may be readily seen therethrough. As a result, when a positive pressure is reached within the vessel 14, the ball 86 will be caused to rise within the bore 83 and to be unseated from the annular seat 85. When this occurs, an operator can readily determine that a positive pressure has been obtained within the vessel 14 and that the valve 21 has been properly set. Preferably, the bore 83 is substantially vertically disposed within the housing 18 so that atmosphere pressure may readily act upon the ball 86. Further, the housing 80 may be cylindrically shaped with the bore 83 extending longitudinally therethrough.

For confining the ball 86 within the housing 80 and the bore 83, a stop means in the form of a pin 87 is provided. The pin 87 which may take the form of a cotter pin extends transversely through the housing 80. As a result, and in accordance with this particular aspect of the present invention, the ball 86 will be confined within the bore 83 notwithstanding the existence of excessive positive pressure within the vessel 14.

Also in accordance with the present invention, the housing 80 is provided with a plurality of transverse apertures 88. These apertures 88 are displaced from the stop pin 87 towards the near end 81 of the housing 80 by a distance which approximates the diameter dimension of the ball 86. As a result, the apertures 88 form relief means for venting excess gas from the system should the pressure within the vessel 14 be so great as to cause the ball 86 to engage the stop pin 87.

From the foregoing, it can be appreciated that the present invention provides a new and improved deaeration system for use in the processing of carbonated beverages, and more particularly to a new and improved positive pressure indicating means. Because the housing 80 is preferably formed from transparent material, the ball indicating element 86 may be readily seen therethrough to allow an operator to determine when a positive pressure is obtained within the dearator system vessel. Furthermore, the stop means pin 87 precludes the ball 86 from exiting the housing 80 in response to excessive positive system pressure and the apertures 88 form a relief means by which positive pressure gases or water may be expelled. Furthermore, by virtue of the check valve 26 being interposed functionally between the vessel 14 and the indicating means 22, the indicating means 22 will be protected from slugs of water travelling along the lead-in conduit 24.

While a particular embodiment of the invention has been shown and described in detail, it will be obvious to those skilled in the art that changes and modifications of the present invention, in its various particular aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

This invention is claimed as follows:

1. An improved deaerator system for purging air from water comprising: container means for containing the water, input means for establishing a positive gas pressure within the container, a first conduit leading from the container at a point above the normal level of water in the container and having a distal end extending in a substantially downward direction, a substantially downwardly extending check valve connected in fluid communication with the first conduit distal end, the check valve including an upstream sleeve, a downstream sleeve, an annular valve seat member disposed between the upstream sleeve and the downstream sleeve, valve head guide means extending from the valve seat, a valve head carried by the guide means, and biasing means for urging the valve head into seating, valve-closed engagement with the valve seat under normal conditions but permitting the valve head to open in a downstream direction away from the valve seat in response to excessive pressure experienced in the upstream sleeve, the system further including positive fluid pressure indicator means having an indicator housing, a second conduit providing fluid communication from a point located on and in the check valve upstream sleeve but spaced apart from the valve seat, to the valve housing bottom, the housing having a substantially vertically disposed through-bore communicating at its bottom with the second conduit, a seat being formed within said through-bore, the indicator means further including an indicating element disposed within said bore, said indicating means being arranged to engage the through-bore seat in the absence of positive pressure within the container means and through-bore, and to disengage said seat and rise in said through-bore in response to positive pressure within the container means and the check valve upstream sleeve, the indicating element being viewable through the housing when disengaged from the seat to provide a readily discernable indication of positive pressure within the container means, and being weighted to rise from the through-bore seat in response to a pressure which is less than that required to unseat the check valve head from its valve-closed position on the check valve seat.

2. A pressure indicating system for indicating positive gas pressure in a container containing water, the system comprising: a first conduit leading from the container at a point above the normal level of water in the container and having a distal end extending in a substantially downward direction, a substantially downwardly extending check valve connected in fluid communication with the first conduit distal end, the check valve including an upstream sleeve, a downstream sleeve, an annular valve seat member disposed between the upstream sleeve and the downstream sleeve, valve head guide means extending from the valve seat, a valve head carried by the guide means, and biasing means for urging the valve head into seating, valve-closed engagement with the valve seat under normal conditions but permitting the valve head to open in a downstream direction away from the valve seat in response to excessive pressure experienced in the upstream sleeve, the system further including positive fluid pressure indicator means having an indicator housing, a second conduit providing fluid communication from a point located on and in the check valve upstream sleeve but spaced apart from the valve seat, to the valve housing bottom, the housing having a substantially vertically disposed through-bore communicating at its bottom with the second conduit, a seat being formed within said through-bore, the indicator means further including an indicating element disposed within said bore, said indicating means being arranged to engage the through-bore seat in the absence of positive pressure within the container means and through-bore and to disengage said seat and rise in said through-bore in response to positive pressure within the container means and the check valve upstream sleeve, the indicating element being viewable through the housing when disengaged from the seat to provide a readily discernable indication of positive pressure within the container means, and being weighted to rise from the through-bore seat in response to a pressure which is less than that required to unseat the check valve head from its valve-closed position on the check valve seat.

3. A system as defined in claim 1 or 2 wherein said housing is coupled to said container means at a point above the water level within said container means.

4. A system as defined in claim 1 or 2 wherein said indicating element means comprises a ball means.

5. A system as defined in claim 4 further including stop means within said bore at a distal end of said housing to confine said ball means within said housing notwithstanding extreme positive pressure within said container means.

6. A system as defined in claim 5 wherein said stop means comprises a pin extending across said bore means 7. A system as defined in claim 5 further including relief means within said housing for relieving excessive pressure within said housing.

8. A system as defined in claim 7 wherein said relief means comprises at least one aperture extending transversely through said housing and intersecting said bore for leading gas in the bore out of the housing.

9. A system as defined in claim 8 wherein said aperture is displaced from said stop means towards said seat by a distance approximating the diameter of said ball.

10. A system as defined in claim 1 or 1 wherein said housing is cylindrical in shape and wherein said through-bore extends longitudinally through said housing.

* * * * *

UNITED STATES PATENT AND TRADEMARK OFFICE
CERTIFICATE OF CORRECTION

PATENT NO. : 4,300,923

DATED : November 17, 1981

INVENTOR(S) : SIGMUND P. SKOLI, ROBERT J. DULIAN, AND DAVID M. KEMP

It is certified that error appears in the above-identified patent and that said Letters Patent are hereby corrected as shown below:

Column 8, line 11, change "in claim 1 or 1" to --in claim 1 or 2--.

Signed and Sealed this

Sixteenth Day of February 1982

[SEAL]

Attest:

Attesting Officer

GERALD J. MOSSINGHOFF

Commissioner of Patents and Trademarks